United States Patent
Kindl et al.

(10) Patent No.: US 9,359,939 B2
(45) Date of Patent: Jun. 7, 2016

(54) SUPERCHARGED INTERNAL COMBUSTION ENGINE WITH TWO-CHANNEL TURBINE AND METHOD

(71) Applicant: Ford Global Technologies, LLC, Dearborn, MI (US)

(72) Inventors: Helmut Matthias Kindl, Aachen (DE); Norbert Andreas Schorn, Aachen (DE); Vanco Smiljanovski, Bedburg (DE); Rob Stalman, Selfkant (DE); Franz Arnd Sommerhoff, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 14/167,933

(22) Filed: Jan. 29, 2014

(65) Prior Publication Data
US 2014/0230432 A1    Aug. 21, 2014

(30) Foreign Application Priority Data
Feb. 20, 2013   (DE) .................. 10 2013 202 750

(51) Int. Cl.
*F02D 23/00*    (2006.01)
*F04D 29/44*    (2006.01)
(Continued)

(52) U.S. Cl.
CPC .............. *F02B 37/001* (2013.01); *F01D 9/026* (2013.01); *F01D 17/10* (2013.01); *F01D 17/12* (2013.01); *F01D 17/14* (2013.01); *F01D 17/141* (2013.01); *F01D 17/146* (2013.01); *F01D 17/148* (2013.01); *F01D 25/24* (2013.01); *F01D 25/30* (2013.01); *F02B 37/025* (2013.01); *F02B 37/18* (2013.01); *F02B 37/183* (2013.01); *F02B 37/22* (2013.01); *F02B 39/00* (2013.01); *F05D 2220/40* (2013.01); *Y02T 10/144* (2013.01)

(58) Field of Classification Search
CPC ...... F02B 37/025; F02B 37/18; F02B 37/183; F01D 9/026; F05D 2220/40; Y02T 10/144
USPC .......... 60/602; 415/146, 147, 148, 205, 211.1
See application file for complete search history.

(56) References Cited

U.S. PATENT DOCUMENTS 2,730,861 A * 1/1956 Buchi ........................... 415/205
3,383,092 A * 5/1968 Cazier ........................... 415/205
(Continued)

FOREIGN PATENT DOCUMENTS

DE         19740609 A1    12/1998
DE     102004055571 A1     6/2006
(Continued)

OTHER PUBLICATIONS

Kindl, Helmut M. et al., "Supercharged Internal Combustion Engine With Two-Channel Turbine and Method for Operating an Internal Combustion Engine of Said Type," U.S. Appl. No. 14/167,884, filed Jan. 29, 2014, 36 pages.

*Primary Examiner* — Thai Ba Trieu
(74) *Attorney, Agent, or Firm* — Julia Voutyras; Alleman Hall McCoy Russell & Tuttle LLP

(57) ABSTRACT

A supercharged internal combustion engine wherein a two-channel turbine comprising a shut-off body positioned within a flow transfer duct within a turbine housing fluidly couples the two channels of a turbine housing to one another via the transfer duct responsive to the exhaust gas flow rate to enable better operation of the turbocharger.

8 Claims, 7 Drawing Sheets

(51) Int. Cl.
  *F04D 29/54* (2006.01)
  *F02B 37/00* (2006.01)
  *F02B 37/18* (2006.01)
  *F01D 9/02* (2006.01)
  *F01D 17/14* (2006.01)
  *F02B 37/02* (2006.01)
  *F02B 37/22* (2006.01)
  *F02B 39/00* (2006.01)
  *F01D 17/10* (2006.01)
  *F01D 17/12* (2006.01)
  *F01D 25/24* (2006.01)
  *F01D 25/30* (2006.01)

(56) References Cited

U.S. PATENT DOCUMENTS

| | | | |
|---|---|---|---|
| 3,423,926 A | 1/1969 | Nancarrow et al. | |
| 3,614,259 A * | 10/1971 | Neff | 415/205 |
| 4,008,572 A * | 2/1977 | Woollenweber, Jr. | 60/602 |
| 4,179,892 A * | 12/1979 | Heydrich | 60/605.2 |
| 4,526,004 A * | 7/1985 | French et al. | 60/602 |
| 4,530,640 A * | 7/1985 | MacInnes | 60/602 |
| 5,943,864 A * | 8/1999 | Sumser et al. | 60/602 |
| 6,250,079 B1 * | 6/2001 | Zander et al. | 60/602 |
| 6,269,643 B1 * | 8/2001 | Schmidt et al. | 60/602 |
| 6,324,847 B1 * | 12/2001 | Pierpont | 60/602 |
| 7,637,106 B2 * | 12/2009 | Hertweck et al. | 60/602 |
| 7,644,585 B2 | 1/2010 | Haugen | |
| 7,934,379 B2 | 5/2011 | Küspert et al. | |
| 8,176,737 B2 * | 5/2012 | Pierpont et al. | 60/605.2 |
| 8,196,403 B2 * | 6/2012 | Hittle et al. | 60/602 |
| 8,201,405 B2 * | 6/2012 | Bruce et al. | 60/602 |
| 9,217,361 B2 * | 12/2015 | Wu | F02B 37/007 60/602 |
| 9,249,761 B2 * | 2/2016 | Talwar | F02M 25/0707 60/605.2 |
| 2003/0000211 A1 * | 1/2003 | Drangel et al. | 60/602 |
| 2010/0266390 A1 | 10/2010 | Henderson et al. | |
| 2011/0052374 A1 | 3/2011 | Arnold | |

FOREIGN PATENT DOCUMENTS

| | | | |
|---|---|---|---|
| DE | 102006058102 A1 | 6/2008 | |
| GB | 2038940 A * | 7/1980 | F02B 37/183 |
| JP | 57137619 A * | 8/1982 | F02B 37/12 |
| WO | 2008028666 A1 | 3/2008 | |
| WO | 2011101005 A1 | 8/2011 | |

* cited by examiner

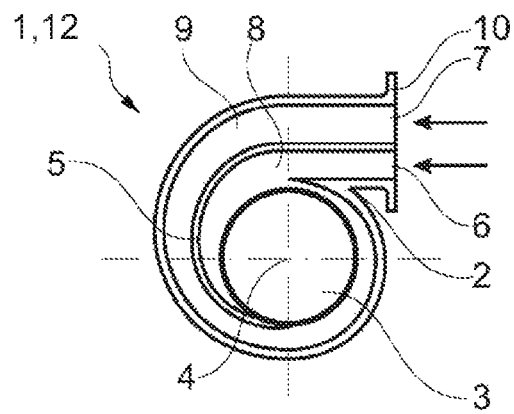
Fig. 1a
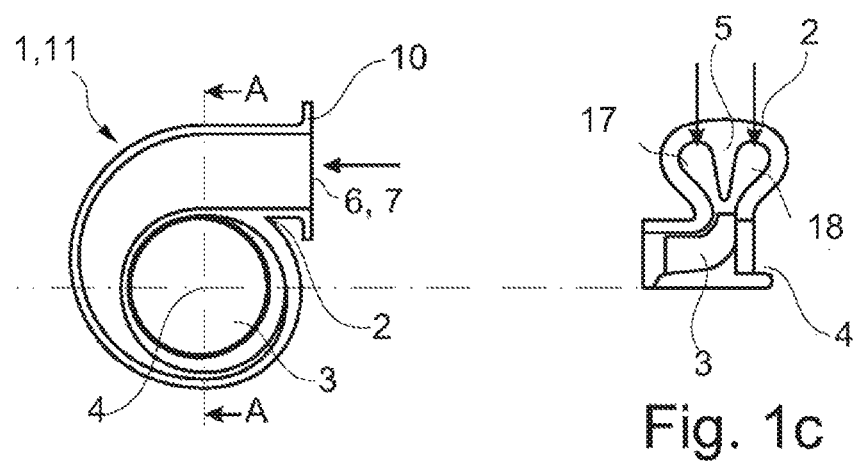
Fig. 1b
Fig. 1c

US 9,359,939 B2

SUPERCHARGED INTERNAL COMBUSTION ENGINE WITH TWO-CHANNEL TURBINE AND METHOD

CROSS REFERENCE TO RELATED APPLICATIONS

The present application claims priority to German Patent Application No. 102013202750.8, filed on Feb. 20, 2013, the entire contents of which are hereby incorporated by reference for all purposes.

BACKGROUND\SUMMARY

Supercharged internal combustion engines comprising a turbocharger or a supercharger coupled to an exhaust manifold to receive exhaust gas may increase the engine's power output. The turbine of the supercharger is provided in the exhaust-gas discharge system. Impulse supercharging at low loads and/or low speeds may increase the turbine rotational speed, which can fall during idle operation and/or low load. Ram supercharging at high loads and/or high speeds may be beneficial under steady state operation of the engine.

One approach to provide the turbocharger with exhaust gas is to merge the exhaust lines of the cylinders to form a first group and second group such that the dynamic wave phenomena in the exhaust lines of the cylinders of a group have the least possible adverse effect on one another. Another approach is to merge the exhaust lines of the cylinders into a single overall exhaust line upstream of the turbine. Further, concepts are known in which the two exhaust manifolds can be connected to and separated from one another.

A potential issue with the above approaches noted by the inventors is that when exhaust lines of cylinders are merged into a first and second group the charge exchange may interfere detrimentally with one another. This approach may prohibit the turbine to be operated optimally at high loads. Another potential issue noted by the inventors is a single overall exhaust line provides a large volume of exhaust gas upstream of the turbine and may impair turbine operation at low exhaust gas flow rates. Further, connecting exhaust manifolds may lead to a residual gas problem and knocking being abetted.

One potential approach to at least partially address some of the above issues includes a supercharged internal combustion engine comprising at least one cylinder head with at least two cylinders, in which the cylinders have at least one outlet opening for discharging the exhaust gases out of the cylinder via an exhaust-gas discharge system, and the outlet opening is adjoined by an exhaust line. The at least two cylinders may be configured in such a way as to form two groups with at least one cylinder per group, the exhaust lines of the cylinders of the cylinder groups merge to form an overall exhaust line such that an exhaust manifold is formed. The two overall exhaust lines may be connected to a two-channel turbine, which comprises a rotor which is mounted on a rotatable shaft in a turbine housing, such that one overall exhaust line is connected to one of two inlet openings of the turbine wherein the inlet openings may be adjoined by one channel of the turbine and the two channels separated from one another as far as the rotor by means of a housing wall, such that the exhaust-gas streams of the two channels may be conducted separate from one another to the rotor. The two channels of the turbine can be connected to one another within the turbine housing by virtue of at least one flow transfer duct upstream of the rotor and downstream of the inlet openings being opened up, for which purpose a shut-off device is provided which has at least one adjustable shut-off body wherein the at least one shut-off body, in a rest position, separates the two channels of the turbine from one another, in a first working position, connects the two channels of the turbine to one another by opening up the flow transfer duct, and in a second working position, connects the two channels of the turbine to one another by opening up the flow transfer duct and opens up a blow-off line which branches off from the exhaust-gas discharge system upstream of the rotor.

Another potential approach to address the above issues is a method for an engine comprising adjusting a shut-off body positioned within a flow transfer duct within a turbine housing upstream of a rotor and downstream of two inlet openings from a rest position to a working position to fluidly couple two channels of the turbine housing to one another via the flow transfer duct responsive to exhaust gas flow rate over a threshold. Further, the method may adjust the shut-off body based on a time increment for the exhaust gas flow rate thresholds. Such an approach may allow the turbine to be operated optimally at low loads and high loads.

Another potential approach to address the above issues is a method for an engine with a shut-off body positioned within a flow transfer duct within a turbine housing comprising using an engine controller to switch the shut-off body in stages and/or a continuously variable fashion. The control element may switch the shut-off body from a rest position, where the shut-off body is abutted to the housing wall closing the flow transfer duct and blow-off passage, to a first working position, where the shut-off body opens the flow transfer duct while still closing the blow-off passage, when an exhaust gas flow rate is above a first threshold. The control element may switch the shut-off body from the rest position or the first working position to a second working position, where the shut-off body opens the flow transfer duct and the blow-off passage, when an exhaust gas flow rate is above a second threshold. The control element may switch the shut-off body from first or the second working position when an exhaust gas flow rate is below a third threshold. Further, the method may adjust the shut-off body using the control element after the exhaust flow rate has met a threshold for a corresponding time increment. By switching in stages, the shut-off body either closes off or opens up the flow transfer duct and/or the blow-off line, which simplifies the control and, in particular, offers cost advantages. A further option is switching in a continuously variable fashion which may reduce torque drop.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF FIGURES

FIG. 1a schematically shows the basic design of a dual-flow turbine, sectioned perpendicularly to the axis of rotation of the rotor.

FIG. 1b schematically shows the basic design of a twin-flow turbine, sectioned perpendicularly to the axis of rotation of the rotor.

FIG. 1c schematically shows the twin-flow turbine illustrated in FIG. 1b, along the section A-A indicated in FIG. 1b.

DETAILED DISCUSSION

Figure 2A:
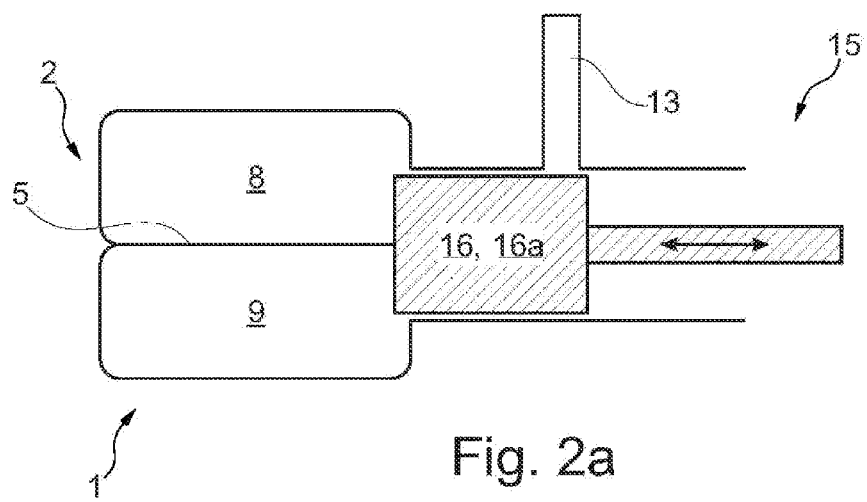
FIG. 2a shows, schematically and sectioned transversely with respect to the two channels, the two-channel turbine of a first embodiment of the supercharged internal combustion engine, with a shut-off body situated in the rest position.

The present application relates to a supercharged internal combustion engine having at least one cylinder head with at least two cylinders, in which a cylinder has at least one outlet opening for discharging the exhaust gases out of the cylinder via an exhaust-gas discharge system, and an outlet opening is adjoined by an exhaust line, at least two cylinders may be configured in such a way as to form two groups with at least one cylinder per group. The exhaust lines of the cylinders of a cylinder group merge to form an overall exhaust line such that an exhaust manifold is formed, and the two overall exhaust lines may be connected to a two-channel turbine, which comprises a rotor which is mounted on a rotatable shaft in a turbine housing, such that one overall exhaust line is connected to one of the two inlet openings of the turbine, wherein an inlet opening is adjoined by one channel of the turbine and the two channels may be separated from one another as far as the rotor by means of a housing wall, such that the exhaust-gas streams of the two channels may be conducted separate from one another to the rotor.

The present application also relates to a method for operating an internal combustion engine of said type.

Within the context of the present application, the expression "internal combustion engine" encompasses in particular Otto-cycle engines but also diesel engines and hybrid internal combustion engines, that is to say internal combustion engines which may be operated using a hybrid combustion process.

Internal combustion engines have a cylinder block and a cylinder head which connect to one another to form the cylinders. The cylinder head conventionally serves to hold the valve drive. To control the charge exchange, an internal combustion engine requires control elements—generally in the form of valves—and actuating devices for actuating these control elements. The valve actuating mechanism considered for the movement of the valves, including the valves themselves, is referred to as the valve drive. During the charge exchange, the combustion gases may be discharged via the outlet openings of the at least two cylinders, and the charging of the combustion chambers, that is to say the induction of fresh mixture or charge air, takes place via the inlet openings.

According to the prior art, the exhaust lines which adjoin the outlet openings may be at least partially integrated in the cylinder head and merge to form a common overall exhaust line or in groups to form two or more overall exhaust lines. The merging of exhaust lines to form an overall exhaust line is referred to generally as an exhaust manifold.

The way in which the exhaust lines of the cylinders may be merged in the specific situation, that is to say the specific configuration of the exhaust-gas discharge system, is dependent substantially on that operating range of the internal combustion engine which is given priority, that is to say the operating ranges for which the operating behavior of the internal combustion engine is to be optimized.

In the case of supercharged internal combustion engines in which at least one turbine of an exhaust-gas turbocharger is provided in the exhaust-gas discharge system and which may be intended to exhibit satisfactory operating behavior in the lower engine speed and/or load range, that is to say in the case of relatively low exhaust-gas flow rates, so-called impulse supercharging is considered.

Here, the dynamic wave phenomena which occur in the exhaust-gas discharge system—in particular during the charge exchange—should be utilized for the purpose of supercharging and for improving the operating behavior of the internal combustion engine.

The evacuation of the combustion gases out of a cylinder of the internal combustion engine during the charge exchange is based substantially on two different mechanisms. When the outlet valve opens close to bottom dead center at the start of the charge exchange, the combustion gases flow at high speed through the outlet opening into the exhaust-gas discharge system on account of the high pressure level prevailing in the cylinder at the end of the combustion and the associated high pressure difference between the combustion chamber and exhaust line. Said pressure-driven flow process is assisted by a high pressure peak which is also referred to as a pre-outlet shock and which propagates along the exhaust line at the speed of sound, with the pressure being dissipated, that is to say reduced, to a greater or lesser extent with increasing distance traveled as a result of friction.

During the further course of the charge exchange, the pressures in the cylinder and in the exhaust line may be equalized, such that the combustion gases may no longer evacuated primarily in a pressure-driven manner but rather may be discharged as a result of the reciprocating movement of the piston.

At low loads or engine speeds, that is to say low exhaust-gas flow rates, the pre-outlet shock may advantageously be utilized for impulse supercharging, as a result of which it is possible to obtain high turbine pressure ratios even at low turbine rotational speeds. In this way, it is possible by means of exhaust-gas turbocharging to generate high charge-pressure ratios, that is to say high charge pressures on the inlet side, even in the case of only low exhaust-gas flow rates, that is to say at low loads and/or low engine speeds.

Impulse supercharging has proven to be particularly advantageous for accelerating the turbine rotor, that is to say for increasing the turbine rotational speed, which can fall to a noticeable extent during idle operation of the internal combustion engine or at low load, and which should frequently be increased again with as little delay as possible by means of the exhaust-gas flow in the event of an increased load demand. The inertia of the rotor and the friction in the shaft bearing arrangement generally slow an acceleration of the rotor to higher rotational speeds and therefore hinder an immediate rise in the charge pressure.

To be able to utilize the dynamic wave phenomena occurring in the exhaust-gas discharge system, in particular the pre-outlet shocks, for the impulse supercharging for improving the operating behavior of the internal combustion engine, the pressure peaks or pre-outlet shocks in the exhaust-gas discharge system must be maintained. It is particularly advantageous if the pressure fluctuations may be intensified in the exhaust lines, but at least do not attenuate one another or cancel one another out.

It is therefore expedient for the cylinders to be grouped, or for the exhaust lines to be merged, in such a manner that the high pressures, in particular the pre-outlet shocks of the individual cylinders, in the exhaust-gas discharge system may be maintained.

The subject matter also encompasses an internal combustion engine in which the cylinders may be grouped. According to the present application, at least two cylinders may be configured in such a way as to form two groups with at least one cylinder. The exhaust lines of the cylinders of a cylinder group merge into an overall exhaust line such that an exhaust manifold is formed. Here, the cylinders may be configured in such a way that the dynamic wave phenomena in the exhaust lines of the cylinders of a group have the least possible adverse effect on one another.

In a cylinder head having four cylinders in an in-line arrangement (e.g., cylinder head 702 having four cylinder 704 shown in FIG. 7), it is advantageous in this regard for two cylinders which have an ignition interval of 360° CA to be combined to form a cylinder group. For example, if the ignition in the cylinders is initiated in accordance with the ignition sequence 1-2-4-3 or in accordance with the ignition sequence 1-3-4-2, it is advantageous for the outer cylinders to be combined to form a first group and for the inner cylinders to be combined to form a second group.

Impulse supercharging however also has disadvantages. For example, the charge exchange is generally impaired as a result of the pressure fluctuations in the exhaust-gas discharge system. The cylinders of a group may have an interfering, that is to say detrimental effect on one another during the charge exchange. The pressure waves originating from a cylinder run not only through the at least one exhaust line of said cylinder but also along the exhaust lines of the other cylinders of said group, specifically possibly as far as the outlet opening provided at the end of the respective line. Exhaust gas which has already been expelled or discharged into an exhaust line during the charge exchange can thus pass back into the cylinder again, specifically as a result of the pressure wave originating from another cylinder. In particular, it has proven to be disadvantageous if, toward the end of the charge exchange, positive pressure prevails at the outlet opening of a cylinder or the pressure wave of another cylinder propagates along the exhaust line in the direction of the outlet opening, as this counteracts the evacuation of the combustion gases out of said cylinder. In said phase of the charge exchange, the combustion gases may be discharged primarily owing to the reciprocating movement of the piston. In individual situations, it may even be the case that exhaust gas originating from one cylinder passes into another cylinder before the outlet thereof closes. The impaired charge exchange leads to disadvantages, in particular under increasing load and with increasing engine speed. The exhaust gas situated in the cylinder, that is to say the residual gas fraction remaining in the cylinder, has a significant influence on the knocking behavior of an applied-ignition internal combustion engine, wherein the risk of knocking combustion rises with increasing exhaust-gas fraction.

It must also be taken into consideration that a turbine is operated most effectively under steady-state engine operating conditions. To enable a turbine which is provided downstream of the cylinders in the exhaust-gas discharge system to be operated optimally at high loads and high rotational speeds, that is to say at high exhaust-gas flow rates, the turbine should be acted on with as constant an exhaust-gas flow as possible, for which reason a pressure which varies as little as possible upstream of the turbine under said operating conditions in order to realize so-called ram supercharging.

As a result of a correspondingly large exhaust-gas volume upstream of the turbine, the pressure pulsations in the exhaust lines can be smoothed. In this respect, the grouping of the cylinders, whereby the exhaust lines may be combined in groups, resulting in the volume of the exhaust-gas discharge system upstream of the turbine being divided into a plurality of partial volumes, has proven to be counterproductive.

With regard to ram supercharging, it may rather be advantageous for the exhaust lines of all the cylinders to be merged into a single overall exhaust line in order to make the exhaust-gas volume of the exhaust-gas discharge system upstream of a turbine which is arranged in said overall exhaust line as large as possible, that is to say to maximize said exhaust-gas volume, and to minimize the pressure fluctuations.

There is thus a resulting conflict of aims when configuring the exhaust-gas discharge system for the purpose of optimizing the exhaust-gas discharge system both with regard to low exhaust-gas flow rates and also with regard to relatively high exhaust-gas flow rates. Grouping the cylinders in order to realize impulse supercharging leads to an expedient operating behavior at low exhaust-gas flow rates, but disadvantages must be accepted at relatively high exhaust-gas flow rates. In contrast, if as large an exhaust-gas volume as possible is realized upstream of the turbine in order to be able to utilize the advantages of ram supercharging at relatively high exhaust-gas flow rates, the operating behavior at relatively low exhaust-gas flow rates is impaired.

Concepts are known from the prior art in which the two exhaust manifolds of the two cylinder groups may be connected to and separated from one another. The exhaust-gas discharge system is then configured as a function of the magnitude of the exhaust-gas flow, that is to say, in the case of low exhaust-gas flow rates, by separating the manifolds in accordance with impulse supercharging, and in the case of relatively high exhaust-gas flow rates, by connecting the manifolds in accordance with ram supercharging.

A disadvantage of the concept described above is that, as a result of the connection of the manifolds, a connection is realized close to the outlet openings of the cylinders, whereby the residual gas problem described above, and the associated knocking problem, is abetted, that is to say intensified.

Against the background of that stated above, it is an object to provide a supercharged internal combustion engine which permits optimized operation both in the case of low exhaust-gas flow rates and in the case of relatively high exhaust-gas flow rates.

It is a further sub-object to specify a method for operating an internal combustion engine of said type.

Figure 7:
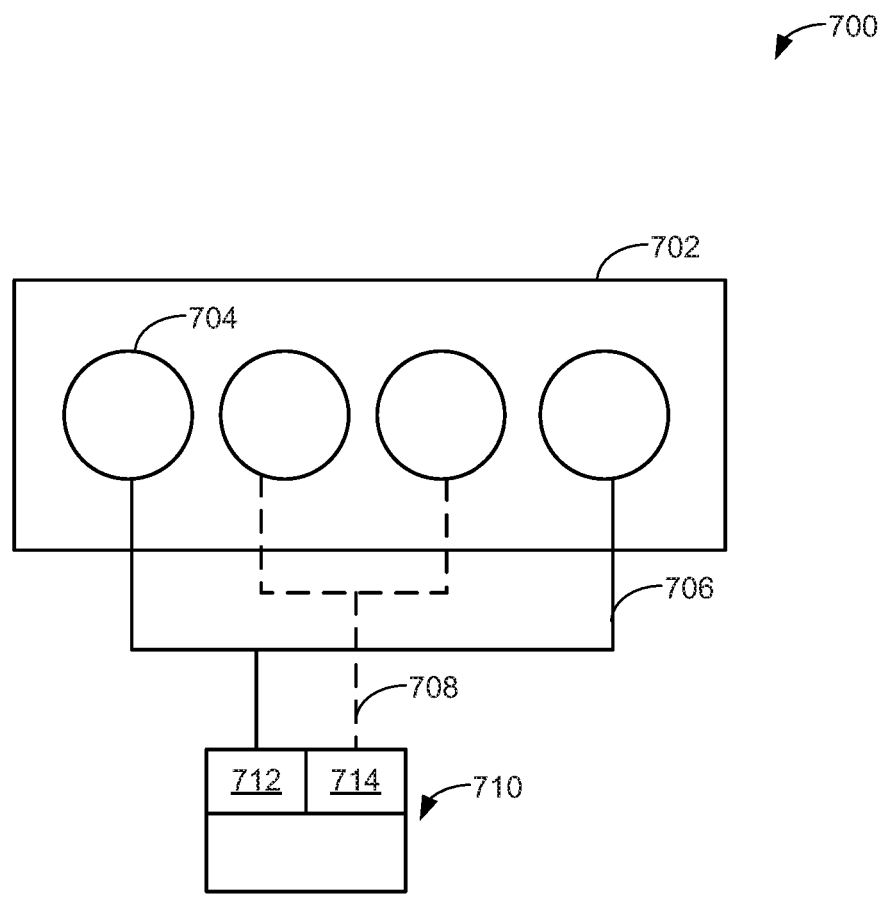
FIG. 7 schematically shows two engine exhaust manifolds leading to inlets of a two-channel turbine.

The first sub-object is achieved by means of a supercharged internal combustion engine having at least one cylinder head with at least two cylinders, in which a cylinder has at least one outlet opening for discharging the exhaust gases out of the cylinder via an exhaust-gas discharge system, and a outlet opening is adjoined by an exhaust line, at least two cylinders may be configured in such a way as to form two groups with at least one cylinder per group. For example, as shown in FIG. 7, the exhaust lines of the cylinders of a cylinder group merge to form an overall exhaust line such that an exhaust manifold is formed, and the two overall exhaust lines 706, 708 may be connected to a two-channel turbine 710, which comprises a rotor which is mounted on a rotatable shaft in a turbine housing, such that one overall exhaust line is connected up to one of the two inlet openings 712, 714 of the turbine, wherein an inlet opening is adjoined by one channel of the turbine and the two channels separated from one another as far as the rotor by means of a housing wall, such that the exhaust-gas streams of the two channels may be conducted separate from one another to the rotor. The two channels of the turbine can be connected to one another within the turbine housing by virtue of at least one flow transfer duct upstream of the rotor and downstream of the inlet openings being opened up, for which purpose a shut-off device is provided which has at least one adjustable shut-off body, wherein the at least one shut-off body, in a rest position, separates the two channels of the turbine from one another, in a first working position, connects the two channels of the turbine to one another by opening up the flow transfer duct, and in a second working position, connects the two channels of the turbine to one another by opening up the flow transfer duct and opens up a blow-off line which branches off from the exhaust-gas discharge system upstream of the rotor.

In the internal combustion engine, the volume of the exhaust system communicating with an individual channel of the turbine can be varied, specifically by virtue of the two channels of the turbine being connected or separated.

Consequently, it is also possible for the exhaust-gas volume or the exhaust-gas discharge system upstream of the rotor of the two-channel turbine to be adapted to different operating conditions of the internal combustion engine, in particular to different exhaust-gas flow rates, and optimized in this regard.

In relation to the connection of the two exhaust manifolds, the connection of the two channels of the turbine has the advantage that the at least one flow transfer duct that connects the exhaust volumes of the two cylinder groups is arranged further remote from the outlet openings of the cylinders, whereby the exhaust line distance between a cylinder of one group and a cylinder of the other group is increased. The risk of mutual, in particular adverse influencing during the charge exchange is thereby counteracted. The above-described residual gas problem or knocking problem is alleviated or eliminated.

The relationships and effects described above may be highly relevant in particular in the case of supercharged internal combustion engines in which the exhaust lines of the cylinders of a cylinder group merge to form an overall exhaust line, such that an exhaust manifold is formed, within the cylinder head, because a connection of the manifolds may result in the realization of a connection situated extremely close to the outlet openings of the cylinders.

The first object on which the present application is based, specifically that of providing a supercharged internal combustion engine which permits optimized operation both in the case of low exhaust-gas flow rates and in the case of relatively high exhaust-gas flow rates, is thereby achieved.

The conflict of aims which is known from the prior art and which results from the different demands placed on the exhaust-gas volume situated upstream of the rotor by the ram supercharging and impulse supercharging, specifically on the one hand the provision of a small volume in order to realize impulse supercharging in the case of relatively low exhaust-gas flow rates, and on the other hand the provision of as large a volume as possible, in order to deplete the pressure peaks and smooth the exhaust-gas pressure, for the purposes of ram supercharging in the case of relatively high exhaust-gas flow rates, is resolved.

In the case of relatively low exhaust-gas flow rates, the two channels of the turbine and thus the exhaust systems of the cylinder groups remain separate from one another, such that a channel communicates only with the exhaust lines of that cylinder group from which it is originally fed. The exhaust-gas volume upstream of a channel is determined by the volume of the exhaust-gas lines of the associated manifold and the volume of the overall exhaust line that connects the manifold to the inlet opening of the corresponding turbine channel.

The relatively small volumes upstream of the rotor permit impulse supercharging. By utilizing the pressure peaks which propagate in the exhaust manifolds, it is then possible to obtain high turbine pressure ratios at only low exhaust-gas flow rates. If the turbine is used within the context of exhaust-gas turbocharging, it is possible in this way to generate high charge pressure ratios, that is to say high charge pressures, at only low exhaust-gas flow rates.

The pressure fluctuations in the exhaust-gas discharge system that may be considered to be disadvantageous within the context of ram supercharging at relatively high exhaust-gas flow rates can be smoothed, and at best even eliminated, by connecting the two channels of the turbine. Here, the volumes of the exhaust-gas discharge system upstream of the rotor may be combined. The individual channel then no longer communicates only with the exhaust-gas volume of the cylinder group associated therewith but likewise communicates with the exhaust-gas volume of the other cylinder group. In this way, an additional volume is provided for the channel, whereby the exhaust-gas volume upstream of the channel is enlarged, or one large volume is provided upstream of the rotor instead of two small volumes. Said volume enlargement better enables an exhaust-gas pressure which varies little, and is substantially constant, upstream of the rotor, and therefore expedient conditions for ram supercharging at relatively high exhaust-gas flow rates.

The inlet region of a two-channel turbine has two inlet ducts. Multi-channel turbines may therefore be particularly suitable for supercharged internal combustion engines in which the exhaust lines of the cylinders may be merged in groups in order to realize impulse supercharging. The two channels, which can be connected to one another, of the two-channel turbine permit a switch between impulse supercharging and ram supercharging. The turbines may fundamentally be fitted with a variable turbine geometry which can be adapted by adjustment to the respective operating point of the internal combustion engine.

In the internal combustion engine according to the present application, the exhaust lines of at least two cylinders may be merged to form two overall exhaust lines such that two exhaust manifolds may be formed. In this respect, embodiments having three, four, five or more cylinders, wherein the exhaust lines of more than two cylinders may be merged to form two overall exhaust lines, may be considered likewise internal combustion engines.

Further advantageous embodiments of the internal combustion engine will be explained in conjunction with the subclaims.

Embodiments of the supercharged internal combustion engine may be advantageous in which the two-channel turbine is a dual-flow turbine.

Here, embodiments may be advantageous in which the two-channel turbine is a dual-flow turbine in which the two channels may be arranged one on top of the other as viewed in a section perpendicular to the axis of rotation of the rotor and, at least along an arc-shaped segment, enclose the rotor in spiral form at different radii.

A dual-flow turbine exhibits greater efficiency, and improved flow impingement on the rotor, in relation to the twin-flow turbine. Furthermore, the dual-flow turbine can be subjected to greater thermal loading. The latter advantage results from the arrangement of the channels one above the other, and will be explained in more detail during the course of the description of the figures.

Embodiments of the supercharged internal combustion engine may however also be advantageous in which the two-channel turbine is a twin-flow turbine.

Here, embodiments may be advantageous in which the two-channel turbine is a twin-flow turbine in which the two channels may be arranged adjacent one another and, at least along an arc-shaped segment, enclose the rotor in spiral form at equal radii.

Embodiments of the supercharged internal combustion engine may be advantageous in which the housing wall is an immovable wall that is fixedly connected to the housing. Said embodiment of the housing wall better enables that the heat introduced into the housing wall by the hot exhaust gas is discharged into and via the housing in an advantageous manner and to an adequate extent.

Figure 4:
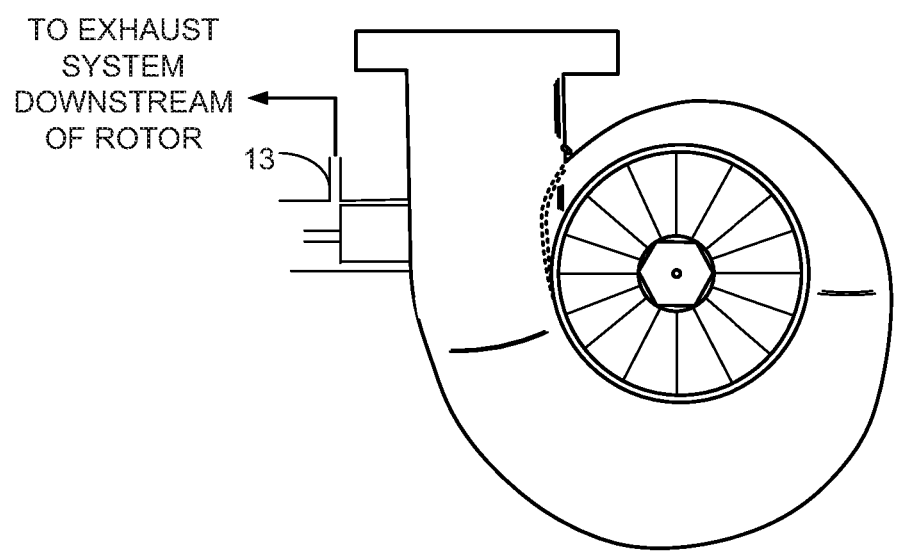
FIG. 4 shows an example method to operate a shut-off body with a piston positioned on the turbo.

Embodiments of the supercharged internal combustion engine may be advantageous in which the blow-off line opens into the exhaust-gas discharge system downstream of the rotor (e.g., as indicated in FIG. 4). Said embodiment makes it possible for both the blown-off exhaust gas and also the exhaust gas that is conducted through the turbine to undergo aftertreatment in a common exhaust-gas aftertreatment system provided in the exhaust-gas discharge system.

Embodiments of the supercharged internal combustion engine may be advantageous in which the at least one shut-off body is a piston that is displaceable in translatory fashion.

Embodiments of the supercharged internal combustion engine may be however also advantageous in which the at least one shut-off body is a rotatable piston.

Embodiments of the supercharged internal combustion engine may likewise be advantageous in which the at least one shut-off body is a rotary slide.

Embodiments may be advantageous in which the at least one shut-off body can be electrically, hydraulically, pneumatically, mechanically or magnetically controlled, by means of the engine controller of the internal combustion engine.

The at least one shut-off body may be adjustable, that is to say switchable, in stages, in such a way that it alternates between the rest position and multiple working positions and either closes off or opens up the flow transfer duct and/or the blow-off line, which simplifies the control and, in particular, offers cost advantages.

The at least one shut-off body is optionally adjustable in a continuously variable fashion in order, for example, to reduce an abrupt torque drop or torque increase during the adjustment of the shut-off body, that is to say upon the transition from impulse supercharging to ram supercharging and vice versa. A continuously variable adjustment of the at least one shut-off body also makes it possible for the exhaust-gas flow rate conducted past the rotor via the blow-off line to be set, that is to say dimensioned in a predefinable manner.

Embodiments of the supercharged internal combustion engine may be advantageous in which the exhaust lines of the cylinders of the cylinder group merge form an overall exhaust line, such that two exhaust manifolds may be formed, within the cylinder head.

The two-channel turbine provided in the exhaust-gas discharge system may then be arranged very close to the outlet of the internal combustion engine, that is to say close to the outlet openings of the cylinders. This has several advantages, in particular because the exhaust lines between the cylinders and the turbine may be shortened.

Since the path to the turbine for the hot exhaust gases is shortened, the volume of the exhaust-gas manifold or of the exhaust-gas discharge system upstream of the turbine also decreases. The thermal inertia of the exhaust-gas discharge system is likewise reduced as a result of the reduction of the mass and the length of the exhaust lines in question.

In this way, the exhaust-gas enthalpy of the hot exhaust gases, which is determined significantly by the exhaust-gas pressure and the exhaust-gas temperature, may be utilized optimally, and a fast response behavior of the turbine better enabled.

The proposed measure also results in a compact design of the cylinder head and thus of the internal combustion engine, and permits dense packaging of the drive unit as a whole.

The shortening of the line lengths and the associated reduction in size of the exhaust-gas volume upstream of the turbine assists the impulse supercharging in the low load and engine speed range.

The second sub-object on which the present application is based, specifically that of specifying a method for operating a supercharged internal combustion engine of an above-described type, is achieved by means of a method in which the two channels of the turbine may be connected to one another, by adjustment of the at least one shut-off body, if the exhaust-gas flow rate from the two cylinder groups exceeds a first predefinable exhaust-gas flow rate, for which purpose the at least one shut-off body is transferred from the rest position into a first working position.

That which has been stated in connection with the internal combustion engine according to the present application likewise applies to the method according to the present application.

In a non-supercharged internal combustion engine, the exhaust-gas flow rate corresponds approximately to the engine speed and/or load of the internal combustion engine, specifically as a function of the load control used in the individual situation. In a traditional Otto-cycle engine with quantity regulation, the exhaust-gas flow rate increases with increasing load even at a constant engine speed, whereas in traditional diesel engines with quality regulation, the exhaust-gas flow rate is dependent merely on engine speed, because in the event of a load shift at constant engine speed, the mixture composition but not the mixture quantity is varied.

If an internal combustion engine with quantity regulation is used in which the load is controlled by means of the flow rate of fresh mixture, the approach in the operation of said internal combustion engine means that the channels of the turbine may be connected to one another if—assuming a fixed engine speed—the load of the internal combustion engine exceeds a first predefinable load, since the exhaust-gas flow rate in an internal combustion engine of said type corresponds to the load, and the exhaust-gas flow rate rises with increasing load and falls with decreasing load. Furthermore, the two channels of the turbine may be connected to one another if the engine speed of the Otto-cycle engine exceeds a predefinable engine speed, because the exhaust-gas flow rate rises with increasing engine speed and falls with decreasing engine speed, independently of the load control used in the individual situation.

If, in contrast, the internal combustion engine is based on quality regulation, in which the load is controlled by means of the composition of the fresh mixture and the exhaust-gas flow rate varies virtually exclusively with engine speed, that is to say is proportional to the engine speed, then in the method for operating said internal combustion engine, the two channels of the turbine may be connected to one another, in a manner independent of load, if the engine speed of the internal combustion engine exceeds a first predefinable engine speed, since in the present case, the exhaust-gas flow rate rises with increasing engine speed and falls with decreasing engine speed.

If the internal combustion engine is one which is supercharged—in particular by means of exhaust-gas turbocharging—it must additionally be taken into consideration that the charge pressure on the inlet side may vary with the load and/or engine speed, and has an influence on the exhaust-gas flow rate. The relationships presented in simplified form above between the exhaust-gas flow rate and the load or engine speed then consequently do not apply in said general form. The method according to the present application is therefore geared very generally to the exhaust-gas flow rate and not to the load or engine speed. The two channels of the turbine may therefore be connected to one another if the exhaust-gas flow rate from the two cylinder groups exceeds a first predefinable exhaust-gas flow rate.

Method variants may be advantageous in which the two channels of the turbine may be connected to one another if the exhaust-gas flow rate from the two cylinder groups exceeds the first predefinable exhaust-gas flow rate and is greater than said first predefinable exhaust-gas flow rate for a predefinable time period $\Delta t_1$.

The introduction of an additional condition for the connection of the two channels is intended to reduce an excessively frequent mode change between impulse supercharging and ram supercharging, in particular a transition to ram supercharging if the exhaust-gas flow rate only briefly exceeds the first predefinable exhaust-gas flow rate and then falls again or fluctuates around the first predefinable value for the exhaust-gas flow rate, without the exceedance justifying a transition to ram supercharging.

Method variants may be advantageous in which the blow-off line is opened up, by adjustment of the at least one shut-off body, if the exhaust-gas flow rate from the two cylinder groups exceeds a second predefinable exhaust-gas flow rate, for which purpose the at least one shut-off body is transferred into a second working position.

Here, method variants may be advantageous in which the exhaust-gas flow rate conducted past the rotor via the blow-off line is set by adjustment of the at least one shut-off body within the second working position.

For reasons already stated above, method variants may be advantageous in which the blow-off line is opened up, by an adjustment of the at least one shut-off body, if the exhaust-gas flow rate from the two cylinder groups falls below the second predefinable exhaust-gas flow rate and is lower than said third predefinable exhaust-gas flow rate for a predefinable time period $\Delta t_2$.

Method variants may be advantageous in which, proceeding from a state in which the channels may be connected to one another, the two channels of the turbine may be separated from one another, by transfer of the at least one shut-off body into the rest position, if the exhaust-gas flow rate from the two cylinder groups falls below a third predefinable exhaust-gas flow rate.

For reasons already stated above, method variants may be advantageous in which the two channels of the turbine may be separated from one another if the exhaust-gas flow rate from the two cylinder groups falls below the third predefinable exhaust-gas flow rate and is lower than said third predefinable exhaust-gas flow rate for a predefinable time period $\Delta t_3$.

The present application will be described in more detail below on the basis of an exemplary embodiment and the figures.

FIG. 1a schematically shows the basic design of a dual-flow turbine 12, sectioned perpendicularly to the axis of rotation 4 of the rotor 3.

The illustrated dual-flow turbine 12 is an example of a two-channel turbine 1, that is to say of a turbine 1 with two channels 8, 9. The turbine 1 has a turbine housing 2 in which a rotor 3 is mounted on a rotatable shaft 4.

The dual-flow turbine 12 is characterized by the fact that the two channels 8, 9 may be arranged one on top of the other and, at least along an arc-shaped segment, surround the rotor 3 in spiral form at different radii. The two inlet openings 6, 7 of the dual-flow turbine 12 may be arranged in a flange 10 of the housing wall 5 at different radial distances from the shaft 4 of the turbine 1, wherein the inlet opening 6, 7 is adjoined by a channel 8, 9 of the turbine 1 and the two channels 8, 9 may be separated from one another as far as the rotor 3 by means of a housing wall 5. In this way, the exhaust-gas streams of the two channels 8, 9 may be conducted separate from one another to the rotor 3.

FIGS. 1b and 1c schematically show the basic design of a twin-flow turbine 11, wherein FIG. 1b is a section perpendicular to the axis of rotation 4 of the rotor 3 and FIG. 1c shows the twin-flow turbine 11 along the section A-A indicated in FIG. 1b.

It is sought to explain only the differences in relation to the dual-flow turbine illustrated in FIG. 1a, for which reason reference is otherwise made to FIG. 1a and the associated description. The same reference symbols have been used for the same components.

The twin-flow turbine 11 is characterized by the fact that the two channels 17, 18 may be arranged adjacent to one another and, at least along an arc-shaped segment, surround the rotor 3 in spiral form at equal radii. The two inlet openings 6, 7 of the twin-flow turbine 11 may be arranged in the housing 2 so as to be spaced apart from the shaft 4 of the turbine 1 by the same radial distance.

The housing wall 5 of the twin-flow turbine 11 is subjected to significantly greater thermal loading at its free end than that of the dual-flow turbine 12, in particular in the transition region to the rotor 3, as can be seen from FIG. 1c.

Figure 2B:
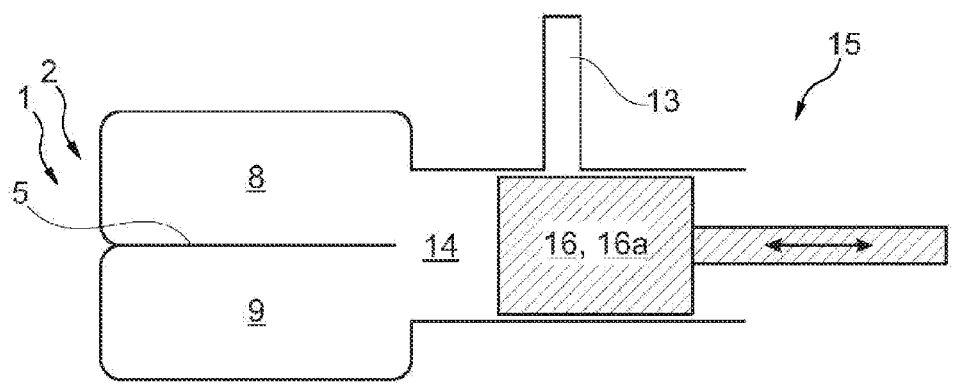
FIG. 2b shows, schematically and sectioned transversely with respect to the two channels, the turbine illustrated in FIG. 2a, with a shut-off body situated in the first working position.
Figure 2C:
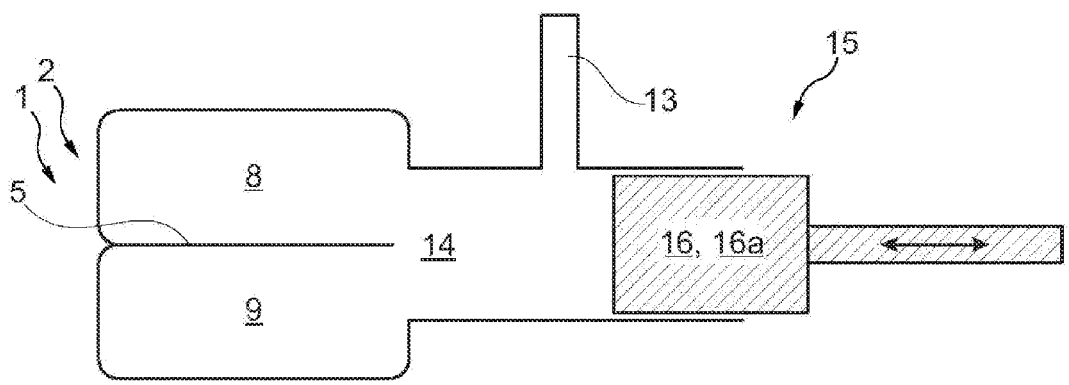
FIG. 2c shows, schematically and sectioned transversely with respect to the two channels, the turbine illustrated in FIG. 2a, with a shut-off body situated in the second working position.

FIGS. 2a, 2b, 2c schematically show the two-channel turbine 1 of a first embodiment of the supercharged internal combustion engine, sectioned transversely with respect to the two channels 8, 9. It is sought merely to explain the additional features in relation to FIGS. 1a, 1b and 1c, for which reason reference is made otherwise to said figures and the associated figure description. The same reference symbols have been used for the same components.

To make it possible for the two channels 8, 9 of the turbine 1 to be connected to one another and separated from one another within the turbine housing 2 by virtue of a flow transfer duct 14 upstream of the rotor being opened up and blocked, respectively, a shut-off device 15 is provided which comprises an adjustable shut-off body 16.

In the embodiment illustrated in FIGS. 2a, 2b and 2c, the shut-off body 16 is a piston 16a that is displaceable in translatory fashion (double arrow).

FIG. 2a shows the piston 16a in the rest position, in which the two channels 8, 9 of the turbine 1 may be separated from one another. By transferring the piston 16 into a first working position, a flow transfer duct 14 is opened up, and the two channels 8, 9 of the turbine 1 may be connected to one another, as illustrated in FIG. 2b. By virtue of the piston 16a being displaced further, the piston 16a passes into a second working position in which both the two channels 8, 9 may be connected to one another and also a blow-off line 13 is opened up. The blow-off line 13 branches off from the exhaust-gas discharge system upstream of the rotor 3 and conducts the exhaust gas past the rotor of the turbine 1.

Figure 3A:
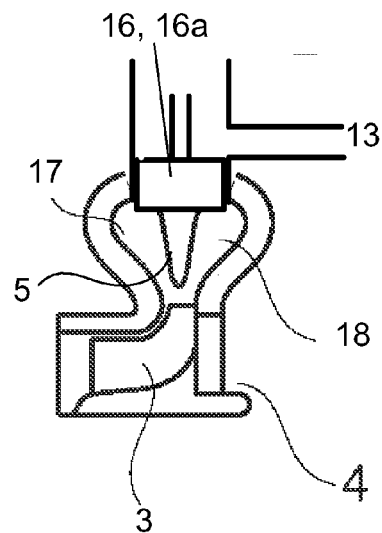
FIG. 3a schematically shows a first embodiment of the supercharged internal combustion engine with a shut-off body situated in the rest position in a twin-flow turbine.
Figure 3B:
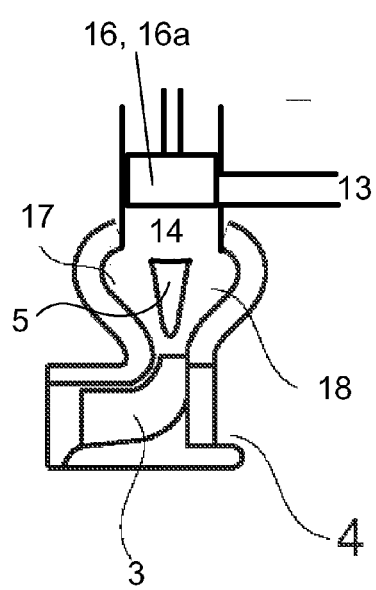
FIG. 3b schematically shows a first embodiment of the supercharged internal combustion engine with a shut-off body situated in the first position in a twin-flow turbine.
Figure 3C:
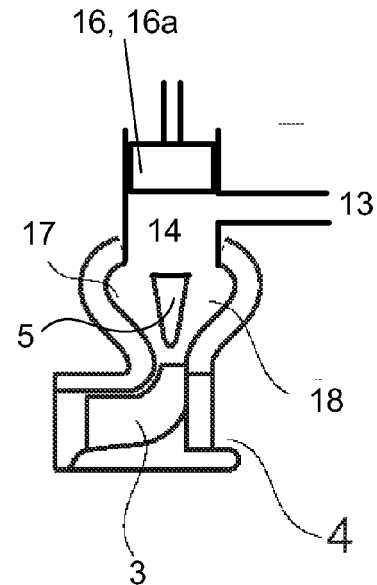
FIG. 3c schematically shows a first embodiment of the supercharged internal combustion engine with a shut-off body situated in the third position in a twin-flow turbine.

In the embodiment illustrated in FIGS. 3a, 3b, and 3c, the shut-off body 16 is a piston 16a that is displaceable in a translatory fashion and is shown on a twin-flow turbine as an example. FIG. 3a shows the piston 16a in the rest position, in which the two channels 17, 18 may be separated from one another. The piston 16a is shown in the first working position in FIG. 3b. A flow transfer duct 14 is opened and the two channels 17, 18 of the turbine 1 may be fluidly connected to one another. The piston 16a is shown in the second working position in FIG. 3c in which the two channels 17, 18 of the turbine 1 may be fluidly connected to one another by a flow transfer duct 14 and a blow-off line 13 is opened up. The blow-off line 13 branches off from the exhaust-gas discharge system upstream of the rotor 3 and conducts the exhaust gas past the rotor of the turbine 1.

Turning to Fig. 4, a first embodiment of the at least one shut-off body on the housing of a turbine is depicted. The at least one shut-off body may be located such that the at least one flow transfer duct in the turbine housing is upstream of the rotor and downstream of the inlet openings of the turbine.

Figure 5:
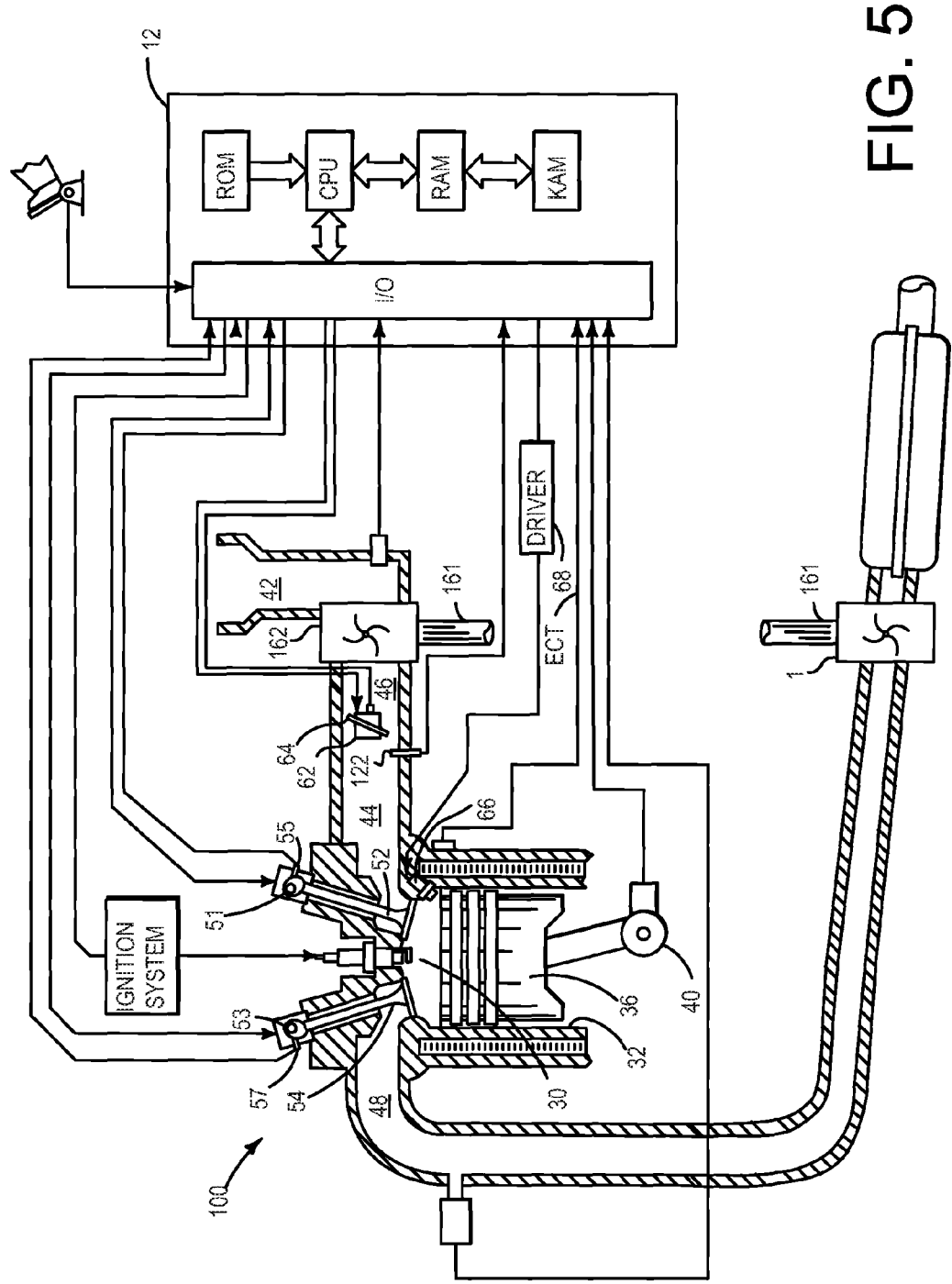
FIG. 5 schematically shows an internal combustion engine

Turning to FIG. 5 a schematic of an internal combustion engine 100 that may be operated with a two-channel turbine 1 is shown. A plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. The intake and exhaust valves may be operated by an electrochemically controlled valve coil and armature assembly. The position of intake cam 51 is determined by the intake cam sensor 55 and the position of the exhaust cam 53 is determined by the exhaust cam sensor 57. Fuel injector 66 is shown positioned to inject fuel directly into cylinder 30, which is known to those skilled in the art as direct injection. Further, fuel may be injected to an intake port. Fuel is delivered by a fuel system (not shown) to fuel injector 66. Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin the two-channel turbine 1 which is coupled to compressor 162 via shaft 161. It will be appreciated that the turbine 1 is generically depicted via a box. As discussed in FIG. 1 the turbine 1 has greater complexity and may be a dual-channel or twin-flow turbine for example. Further, controller 12 may include a program to operate the shut-off valve 16.

Figure 6:
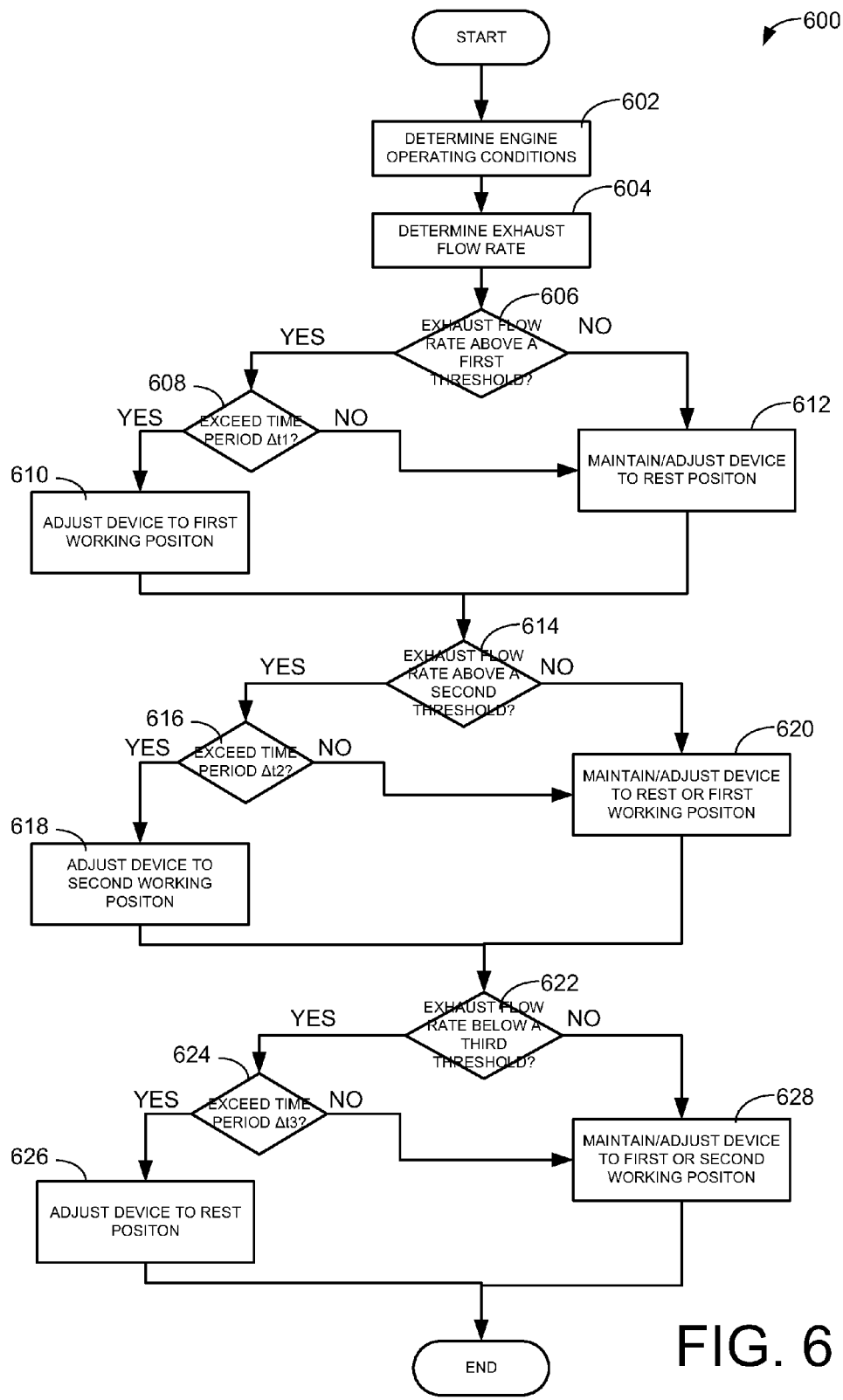
FIG. 6 illustrates an example method for a first embodiment of the shut-off body.

Turning to FIG. 6 a method to operate a shut-off valve as shown in the first embodiment is given. In one example, the shut-off valve may be switchable, in stages, in such a way that it alternates between the rest position and multiple working positions and either closes off or opens up the flow transfer duct and/or the blow-off line, which simplifies the control and, in particular, offers cost advantages. Further, in another example, the shut-off body may be adjustable in a continuously variable fashion in order, for example, to reduce an abrupt torque drop or torque increase during the adjustment of the shut-off body, that is to say upon the transition from impulse supercharging to ram supercharging and vice versa. A continuously variable adjustment of the at least one shut-off body also makes it possible for the exhaust-gas flow rate conducted past the rotor via the blow-off line to be set, that is to say dimensioned in a predefinable manner.

At 602 the method may determine the engine operating conditions. This may include engine speed, engine load, charge pressure on inlet side, etc.

At 604 the method may determine the exhaust flow rate based on the engine operating conditions determined at 602. The method may further determine if the internal combustion engine is based on quantity regulation, quality regulation, supercharging, etc. in order to determine the exhaust flow rate.

At 606 the method may determine if the exhaust flow rate is above a first threshold. If no at 606, the method may proceed to 612 and maintain the shut-off device position or adjust the shut-off device piston to the rest position. The shut-off device piston abuts the housing wall blocking fluid communication between the two channels.

If yes at 606, the method may proceed to 608 and determine if the exhaust flow rate stayed above the first threshold for a time period Δt1. Introducing the time period reduces an excessively frequent mode change between impulse supercharging (i.e. the rest position) and ram supercharging (i.e. the first or second position). If no at 608, the method may proceed to 612 and maintain the shut-off device position or adjust the shut-off device piston to the rest position. If yes at 608 the method may proceed to 610 and adjust the device to a first working position wherein the flow transfer duct is opened and the two channels may be connected. The shut-off device blocks the blow-off line in the first working position. For example, at high loads, and/or high engine speed fluidly connecting the two channels by adjusting the shut-off device to the first working position better enables a constant exhaust gas flow rate to the turbine.

The method may proceed to 614 from either 612 or 610 and determine if the exhaust flow rate is above a second threshold. The second threshold being a higher exhaust gas flow rate than the first threshold exhaust gas flow rate. If no at 614, the method may proceed to 620 and maintain the shut-off device position or adjust the shut-off device piston to a first working position or rest position.

If yes at 614, the method may proceed to 616 and further determine if the exhaust flow rate stayed above the second threshold for a time period Δt2. If no at 616, the method may proceed to 620 and maintain the shut-off device position or adjust the shut-off device piston to a first working position or rest position. If yes at 616, the method may proceed to 618 and adjust the shut-off device piston to the second working position wherein the flow transfer duct is opened connecting the two channels and a blow-off line is opened which conducts the exhaust gas past the rotor of the turbine. For example, if the exhaust gas flow rate increases above a desired boost pressure, opening the blow-off line in addition to fluidly coupling the two channels by adjusting the shut-off device to a second position better enables maintaining a boost level.

The method may proceed to 622 from either 618 or 620 and determine if the exhaust gas flow rate is below a third threshold. The third threshold being lower than the first or second threshold exhaust gas flow rate. If no at 622, the method may proceed to 628 and maintain the shut-off device position or adjust the shut-off device to a first or second working position.

If yes at 622, the method may proceed to 624 and determine if the exhaust flow rate was below the third threshold for a time period Δt3. If no at 624 the method may proceed to 628 and maintain the shut-off device position or adjust the shut-off device to a first or second working position. If yes at 624, the method may proceed to 626 and adjust the shut-off device to the rest position. For example, at idle, low loads, and/or low engine speed separating the two channels by adjusting the shut-off device to the rest position better enables impulse supercharging.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. A method of operating an engine system, for an engine comprising:
    with a controller,
        determining an exhaust flow rate based on engine operating conditions including at least one of an engine speed or an engine load; and
        adjusting a shut-off body positioned within a flow transfer duct within a turbine housing upstream of a rotor and downstream of two inlet openings from a rest position to a working position to fluidly couple two channels of the turbine housing to one another via the flow transfer duct responsive to the exhaust gas flow rate exceeding a threshold for a predefined time period.

2. The method as claimed in claim 1, wherein the threshold is a first threshold,
    wherein in the rest position the shut-off body covers the flow transfer duct fluidly coupling the two channels when the exhaust gas flow rate is below a third threshold, the third threshold lower than the first threshold, and the two inlet openings being positioned at an exterior of the housing at a flange.

3. The method as claimed in claim 2 further comprising adjusting the shut-off body to the rest position when the exhaust gas flow rate is below the third threshold for third predefined time period.

4. The method as claimed in claim 1 wherein the working position is a first working position, wherein the threshold is a first threshold, and wherein the predefined time period is a first predefined time period.

5. The method as claimed in claim 1 further comprising, with the controller, adjusting the shut-off body to a second working position when the exhaust gas flow rate is above a second threshold, the second threshold higher than the first threshold, and wherein when the shut-off body is in the second working position, the two channels are connected via the flow transfer duct and a blow-off line opens up.

6. The method as claimed in claim 5 further comprising, with the controller, adjusting the shut-off body to the second working position when the exhaust gas flow rate is above the second threshold for second predefined time period.

7. A method for operating an engine system, comprising:
    with an electronic engine controller,
        determining an exhaust gas flow rate based on engine operating conditions including at least one of an engine speed or an engine load;
        switching a shut-off body positioned within a flow transfer duct within a turbine housing to be abutted against a housing wall closing the flow transfer duct and a blow-off line when the exhaust gas flow rate is below a third threshold for a third predefined time period;
        switching the shut-off body to open the flow transfer duct and close the blow-off line when the exhaust gas flow rate is above a first threshold for a first predefined time period, the first threshold lower than the third threshold; and
        switching the shut-off body to open both the flow transfer duct and the blow-off line when the exhaust gas flow rate is above a second threshold for a second predefined time period, the second threshold higher than the first threshold and the third threshold.

8. The method as claimed in claim 7 wherein the shut-off body is switched in a continuously variable fashion via the electronic engine controller.

* * * * *